(12) United States Patent
Neeman et al.

(10) Patent No.: US 7,760,114 B2
(45) Date of Patent: Jul. 20, 2010

(54) SYSTEM AND A METHOD FOR GENERATING AN INTERLEAVED OUTPUT DURING A DECODING OF A DATA BLOCK

(75) Inventors: Yuval Neeman, Ashquelon (IL); Guy Drory, Givataim (IL); Aviel Livay, Holon (IL); Inbar Schori, Givataim (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/261,606

(22) Filed: Oct. 30, 2008

(65) Prior Publication Data

US 2010/0111291 A1    May 6, 2010

(51) Int. Cl.
*H03M 7/00* (2006.01)
(52) U.S. Cl. .......................................... 341/81; 341/51
(58) Field of Classification Search .................... 341/81, 341/82, 51, 59, 61; 714/701, 755, 786
See application file for complete search history.

(56) References Cited

U.S. PATENT DOCUMENTS

| | | | | |
|---|---|---|---|---|
| 5,404,454 | A | * | 4/1995 | Parks .......................... 710/21 |
| 5,483,541 | A | * | 1/1996 | Linsky ........................ 714/701 |
| 6,603,412 | B2 | * | 8/2003 | Gatherer et al. ............... 341/61 |
| 2004/0103359 | A1 | | 5/2004 | Molina |

* cited by examiner

*Primary Examiner*—Brian Young
(74) *Attorney, Agent, or Firm*—Reches Patents

(57) ABSTRACT

A method for generating an interleaved output during a decoding of a data block, the method includes: (i) selecting, in response to a row indicator, a row register and a multiplication factor to provide a selected row register and a selected multiplication factor; wherein the selected multiplication factor is responsive to a size of the data block; (ii) multiplying a value stored in the selected row register by the selected multiplication factor to provide an intermediate result; (iii) performing a modulo P operation on the intermediate result to provide a permutated result; wherein the permutated result and the value stored in the selected row register are adjacent elements of the same permutation; wherein P is responsive to a size of the data block; (iv) writing the permutated result to the selected row register; and (v) outputting a data block element that is selected in response to the permutated result.

18 Claims, 4 Drawing Sheets

SYSTEM AND A METHOD FOR GENERATING AN INTERLEAVED OUTPUT DURING A DECODING OF A DATA BLOCK

FIELD OF THE INVENTION

This disclosure relates generally to a method for generating an interleaved output during a decoding of a data block, and to a system.

BACKGROUND OF THE INVENTION

Wireless communication systems are widely deployed to provide various types of communications such as voice and data. One such system is wide band code division multiple access (WCDMA), which has been adopted in various competing wireless communication standards, for example the third generation partnership project 3GPP.

To overcome data corruption that can occur during RF transmission, the different wireless communication standards typically use some form of channel coding, where one common channel coding technique is turbo coding.

Turbo coding involves the use of a turbo encoder for encoding a code segment (i.e. a data packet) and a turbo decoder for the decoding of the encoded code segment. A turbo encoder typically includes a pair of convolutional encoders, one of which receives information bits (i.e. systematic bits) while the other convolutional encoder receives vinterleaved information bits. The information bits are shuffled (interleaved) in accordance with a specified interleaving scheme. The pair of convolutional encoders output two sequences of parity bits that are modulated and transmitted to a receiver. The systematic bits are also modulated and transmitted to the receiver.

The third generation partnership project (3GPP) defines an interleaver that performs inter row interleaving that is followed by intra row interleaving. There interleaving is applied on a rectangular matrix that include data elements that are arranged in rows and columns. The 3GPP standard defines the number of row and columns of the rectangular matrix—in response to the size of the data block. For example, for a data block of 40 till 159 data elements there are five rows, for a data block of 160 till 200 data elements or of 481 till 530 data elements there are ten rows and for any other size of data block there are twenty rows. The 3GPP standard also defines the number of columns of the rectangular matrix, a prime number P, and a primitive root v, all being used during the intra row permutation and all dependent upon the size of the data block.

The intra row permutation includes multiple permutations that are knows as a primary permutation and a secondary permutation. The primary permutations precedes the secondary permutation. The primary permutation is applied on the elements in a row while the secondary permutation is applied on the results of the primary permutation. The results of the primary permutation are used to select an entry of a data structure (also known as an S-table that stores the results of applying the secondary permutation. In data blocks that are very long, the S-table is very long and each interleaving process requires many accesses to the S-table. The 3GPP standard also defines which primary permutation functions to associate with which rows of the rectangular matrix.

For simplicity of explanation, in the following a modulo operation is denoted as "%"—the term A%B means applying a B modulo operation on variable A.

For a data block that includes 40 data elements the following primary permutation functions are defined: $P1(A)=A\%6$, $P2(A)=(5A)\%6$, and the secondary permutation is $S(A)=3^A\%7$ wherein $3^A$ stands for 3 by the power of A. P1(A) defines a permutation P1 that includes the following elements (in the following order): 0, 1, 2, 3, 4, 5. P2(A) defines a permutation P2 that includes the following elements (in the following order): 0, 5, 4, 3, 2, 1. S(A) defines a permutation S that includes the following elements: 1, 3, 2, 6, 4, 5.

The calculation of P2(A) and S(A) is complex, and the complexity of the permutation functions dramatically increases with an increase in the size of the data block. Due to the complexity of these calculations, S(A) is calculated in advance—and the possible values of S(A) are stored in the mentioned above S table. The calculation of P2(A) may require a complex and area consuming modulo circuit, especially when it is applied on large numbers.

SUMMARY

The present invention provides methods and systems as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It has been found that recursive calculation of row permutation functions, especially those who implement an exponential function, can be highly efficient and can operate without an S-table and without many accesses to memory units.

For simplicity of explanations the following examples will refer to interleaving a data block that include 40 data elements (K=40).

Figure 1:
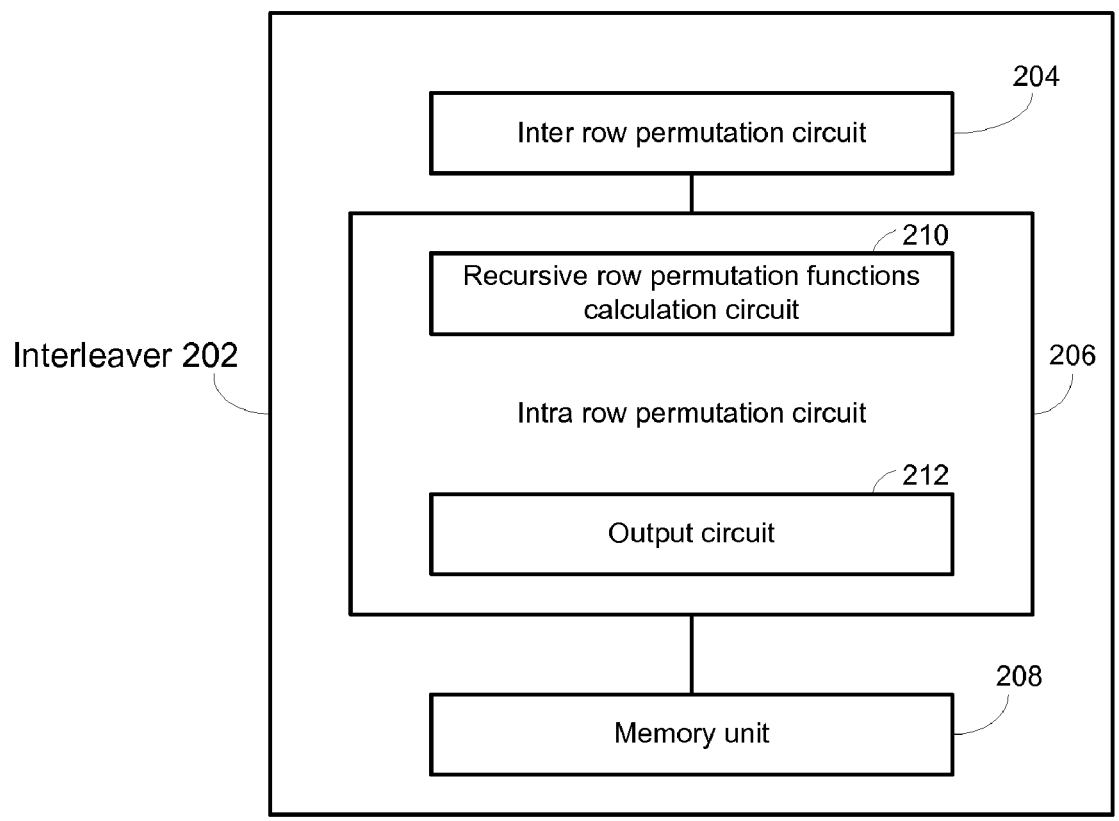
FIG. 1 schematically shows an embodiment of a system.

FIG. 1 schematically shows an example of an embodiment of system 200.

System 200 includes interleaver 202 that can be a part of a turbo decoder. System 200 can receive data and process it, one data block after the other, to provide decoded data streams. The decoded data stream can be sent e.g. to a loud speaker or to another audio circuit that generates sounds in response to the audio stream.

Interleaver 202 can include inter row permutation circuit 204 as well as intra row permutation circuit 206. Intra row permutation circuit 206 includes recursive row permutation functions calculation circuit 210.

Recursive row permutation functions calculation circuit 210 is configured to calculate in a recursive manner each row permutation functions out of multiple row permutation functions to provide permutated results. Each row permutation function (PFr) has the form of $PFr(Y)=$modulo $P\ (Qr^Y)$. A plurality of row permutation functions have Qr of different values. Each row permutation function is associated with a row of a rectangular matrix that stores data elements of the data block. The rectangular matrix is stored in memory unit 208.

Intra row permutation circuit 206 also includes output circuit 212 that is adapted to output data block elements that are selected in response to permutated results outputted by recursive row permutation functions calculation circuit 210.

Recursive row permutation functions calculation circuit 210 can be initialized by providing initial values to multiple row requesters. Recursive row permutation functions calculation circuit 210 can be configured to repetitively multiply a current value of the row register by a multiplication factor to provide an intermediate result; perform a modulo P operation on the intermediate result to provide a permutated result; and write the permutated result to the row register.

A forward multiplication factor equals a result of a modulo P operation on $V^I$; wherein V is a primitive root selected in response to the size of the data block and I is indicative of a number of repetitions of the stages of multiplying, performing, and writing. A backward multiplication factor can be an inverted element of the forward multiplication factor. Element A if an inverted element of element B if $(A \times B)\%P=1$.

Conveniently, recursive row permutation functions calculation circuit 210 is configured to receive a direction indication and select the multiplication factor in response to the direction indication and to a row indicator.

Figure 2:
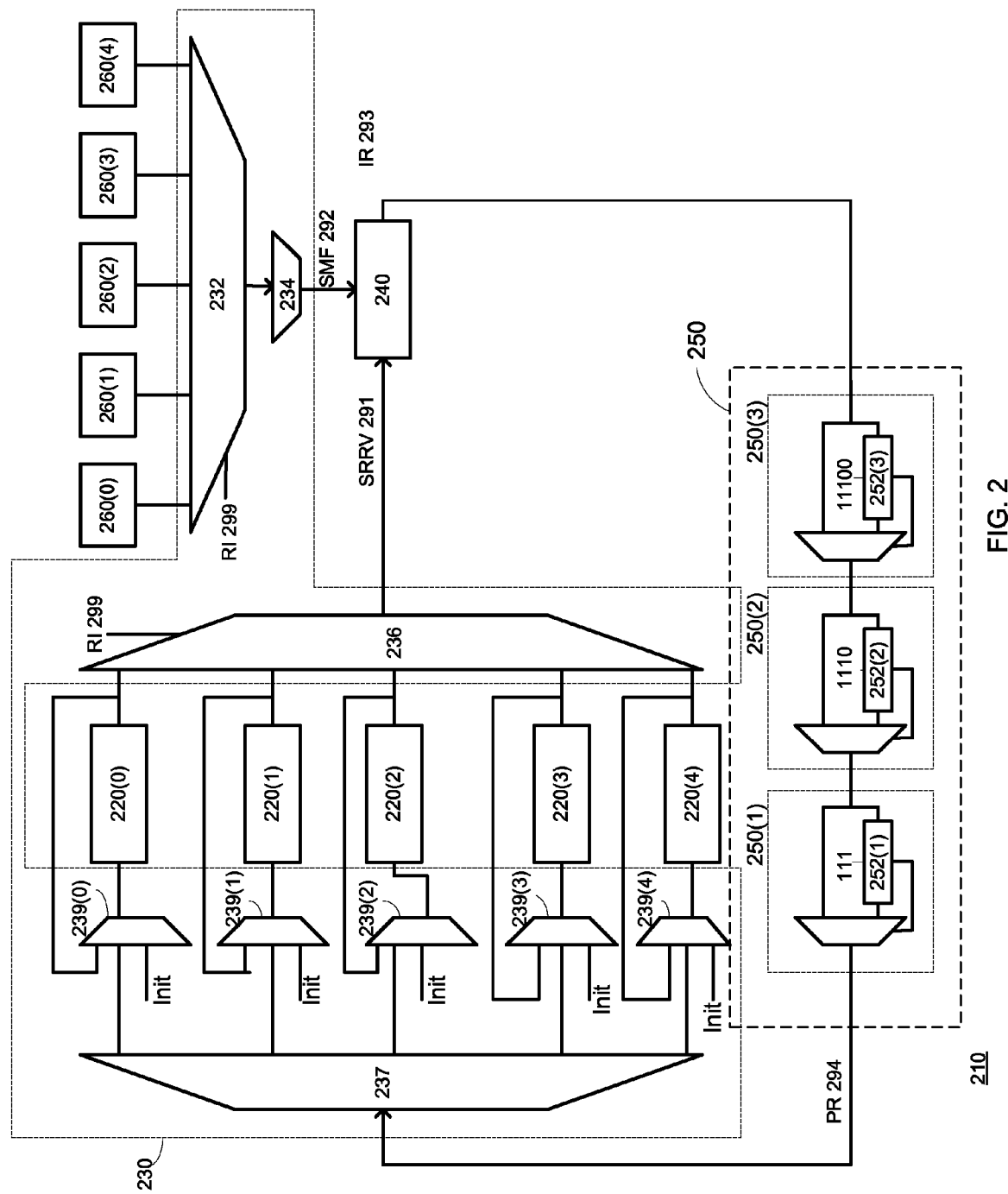
FIG. 2 schematically shows an embodiment of recursive row permutation functions calculation circuit.

FIG. 2 schematically shows an embodiment of recursive row permutation functions calculation circuit 210.

Recursive row permutation functions calculation circuit 210 includes multiple row registers 220(0)-220(4), selection circuit 230, multiplier 240 and modulo P circuit 250.

Each row is associated with a certain row permutation function. The association between a row and a row permutation function is driven from the 3GPP standard. For example, rows R0, R1 and R3 are associated with row permutation function P1(A) while rows R2 and R4 are associated with row permutation function P2(A). Accordingly, rows R0, R1 and R3 are associated with row permutation function S1(A) while rows R2 and R4 are associated with row permutation function S2(A).

Selection circuit 230 is configured to select, in response to a row indicator, a row register and a multiplication factor to provide a selected row register and a selected multiplication factor (SMF) 292. The selected multiplication factor is responsive to a size of the data block and can also be responsive to a direction indicator (backward or forward). Selection unit 230 is also configured to write a permutated result (PR) 294 to the selected row register.

Multiplier 240 is configured to multiply a value (also referred to as selected row register value—SRRV 291) that is stored in the selected row register by the selected multiplication factor to provide an intermediate result (IR) 293.

Modulo P circuit 250 is configured to perform a modulo P operation on the intermediate result IR 293 to provide a permutated result (PR) 294. PR 294 and SRRV 291 are adjacent elements of the same permutation. P is responsive to a size of the data block.

Selection circuit 230 includes first multiplexer 232, second multiplexer 234, third multiplexer 236, de-multiplexer 237 and multiple row register multiplexers 239(0)-239(4). First multiplexer 232 has five inputs, one control input and one output. The control input receives a row indicator (RI) 299 and selects a pair of forward multiplication factor and backward multiplication factor that corresponds to the row indicated by RI 299. Five pairs of forward and backward multiplication factors (3,5), (3,5), (5,3), (3,5) and (5,3) are stored in multiplication factor registers 260(0)-260(4) that are connected to the five inputs of first multiplexer 232.

Second multiplexer 234 has two inputs, a control input and an output. The selected pair of forward and backward multiplication factors is provided to the two inputs of second multiplexer 234. A direction indication (DI) 298 provided to the control input of second multiplexer 234 selects one out of the forward and backward multiplication factors.

The selected multiplication factors (SMF) 292 is sent to multiplier 240. Multiplier 240 also receives SRRV 291 and multiplies these variables to provide an intermediate result (IR) 293. In mathematical terms: $IR=SRRV \times SMF$.

IR 293 is provided to Modulo P circuit 250 that is configured to perform a modulo P operation by a sequence of subtractions and comparisons that start by subtracting the intermediate result from a variable that equals $Px2^x$; wherein a length of the variable equals a number of bits of the intermediate result. Modulo P circuit 250 includes multiple stages 250(X)-250(1), wherein the x'th stage (index x ranges between X and 1) performs a subtraction of $Px2^x$ from an output of the (x+1)'th stage. Thus, assuming that IR 293 is six bits wide then X equals three (as P is represented by three digits and six minus three equals three) and the third stage 250(3) subtracts 11100 (seven followed by two zeros) from IR 293 to provide a first modulo intermediate result MIR1. The output of stage 250(3) can be either MIR1 or IR—depending upon whether MIR1 is positive or negative. The second stage 250(2) subtracts 1110 (seven followed by one zero) from the output of stage 250(3) to provide a second modulo intermediate result MIR2. The output of stage 250(2) can be either MIR2 or the output of stage 250(3).

In a nut shell, modulo P circuit 250 selects as a permutated result the output of a stage that provided a positive subtraction result and is followed by a stage that provides a negative subtraction result.

It is noted that a sampling stage (not shown) follows each stage out of stages 250($x$)-250(1). The sampling stage that follows stage 250(1) can store a valid PR 94 few cycles after the SRRV 291 was multiplied. PR 294 should be written before re-using SRRV 291 so it can use the new value of PR 294.

The x'th stage includes a subtraction unit and a multiplexer. The subtraction unit receives $Px2^x$ and the output of the (x+1) 'th stage. The output of the subtraction unit and the output of the (x+1)'th stage are provided to a multiplexer that selects between these two values in response to a value of a carry bit of the subtraction unit. Referring to FIG. 2, stage 250(2) includes subtraction unit 252(2) and multiplexer 254(2). Subtraction unit 252(2) receives 1110 and the output of stage 250(3). The output of subtraction unit 252(2) and the output of stage 250(3) are provided to multiplexer 254(2) that selects between these two values in response to a value of a carry bit CB(2) 256(2) of subtraction unit 252(2).

Permutated result 294 is provided to de-multiplexer 237. De-multiplexer 237 provides the permutated result to selected row register multiplexer that is connected to the selected row register. De-multiplexer 237 has a control input that receives row indicator 299 and five outputs that are connected to row register multiplexers 239(0)-239(4). Each row register multiplexer has three inputs—a first input connected to de-multiplexer 237 (for writing a permutated result to a row register), a second input connected to the output of the row register (to write to the row register the current value of the row register) and a third input through which an initialization value is written to the row register. During an initialization phase the third input of row register multiplexers 239(0)-239(4) is selected, during further iterations of the permutation calculation process only the row register multiplexer of the selected row register selects the first input while the row register multiplexers of non-selected row registers select the second input.

While FIG. 2 illustrates a system that is configured to interleave data blocks that include forty data elements, this is not necessarily so and it can be configured to process data blocks of other sizes. In this case each row can be associated with a dedicated row permutation function of the form of $PFr(Y)=$modulo P $(Qr^Y)$. Values stored in row registers can be multiplied by multiplication factors that are calculated in advance and stored in multiplication factor registers.

While FIG. 2 illustrates a single recursive row permutation functions calculation circuit system 200 can include multiple recursive row permutation functions calculation circuits that can operate in parallel in order to increase the throughput of system 200. The 3GPP standard allows to output three permutation results per cycle and allows one faulty permutation result per cycle. Thus, system 200 can include three recursive row permutation functions calculation circuits that work concurrently but are fed, per each cycle, by a different row indicator. Assuming, that at a given moment, these three recursive row permutation functions calculation circuit are fed by RI, RI+1 and RI+2 then during the next cycle they will be fed by RI+2, RI+3 and RI+4 if RI, RI+1 and RI+2 were all valid but will be fed (during the next cycle) by RI+3, RI+4 and RI+5 if one out of RI, RI+1 and RI+2 was faulty.

Figure 3:
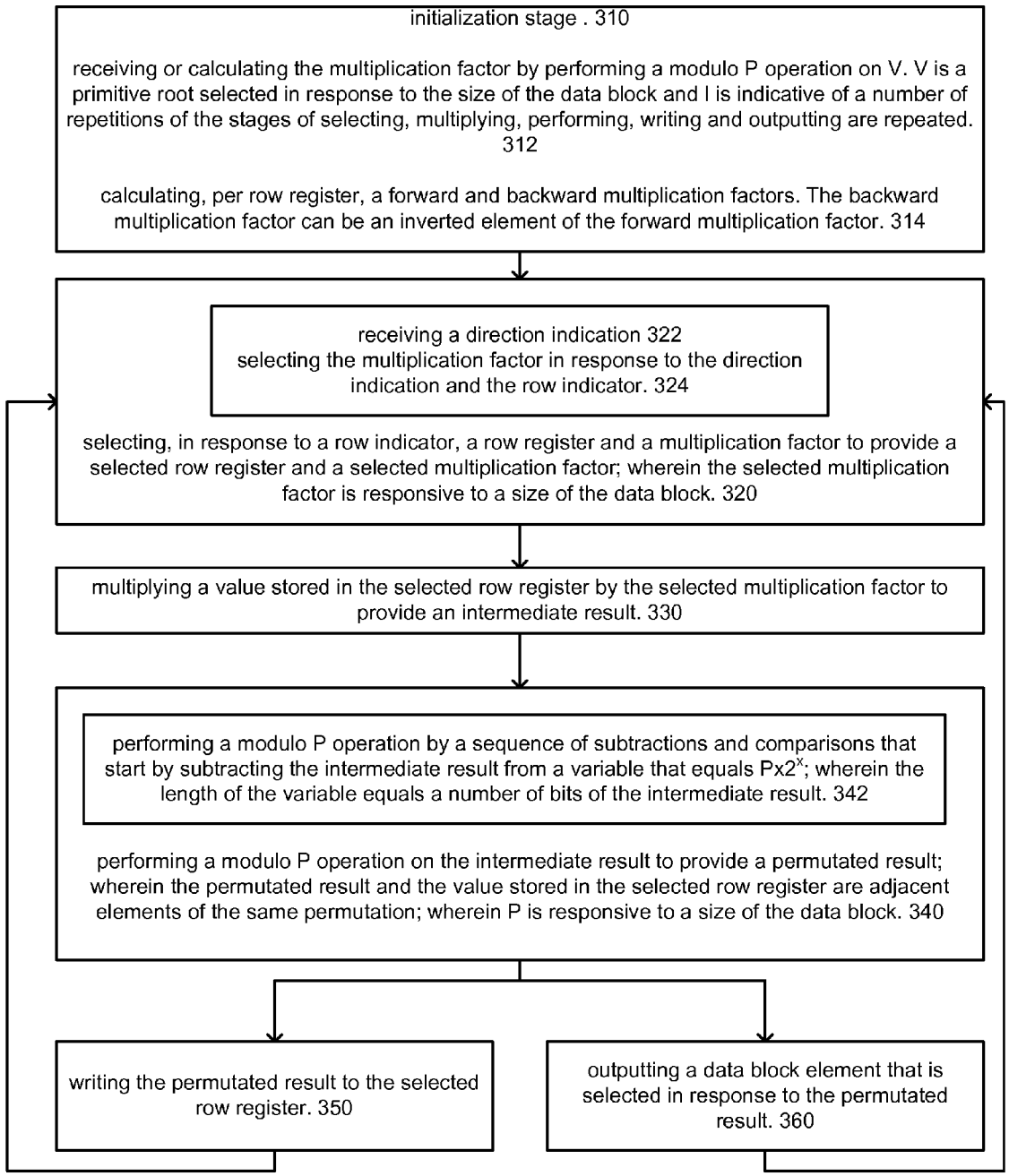
FIG. 3 schematically shows an example of an embodiment of a method.

FIG. 3 schematically shows an example of an embodiment of method 300 for generating an interleaved output during a decoding of a data block.

Method 300 starts by initialization stage 310. Stage 310 can include writing initialization values to row registers.

Stage 310 is followed by stage 320 of selecting, in response to a row indicator, a row register and a multiplication factor to provide a selected row register and a selected multiplication factor; wherein the selected multiplication factor is responsive to a size of the data block.

Stage 320 is followed by stage 330 of multiplying a value stored in the selected row register by the selected multiplication factor to provide an intermediate result.

Stage 330 is followed by stage 340 of performing a modulo P operation on the intermediate result to provide a permutated result; wherein the permutated result and the value stored in the selected row register are adjacent elements of the same permutation; wherein P is responsive to a size of the data block.

Stage 340 is followed by stages 350 and 360. Stage 350 includes writing the permutated result to the selected row register. Stage 360 includes outputting a data block element that is selected in response to the permutated result.

Stages 350 and 360 can be followed by stage 320, until a predefined stop criterion is fulfilled.

Stage 310 can include stage 312 of receiving or calculating the multiplication factor by performing a modulo P operation on V. V is a primitive root selected in response to the size of the data block and I is indicative of a number of repetitions of the stages of selecting, multiplying, performing, writing and outputting are repeated.

Stage 320 can include stage 322 of receiving a direction indication and stage 324 of selecting the multiplication factor in response to the direction indication and the row indicator.

Stage 310 can include stage 314 of calculating, per row register, a forward and backward multiplication factors. The backward multiplication factor can be an inverted element of the forward multiplication factor.

Stage 340 can include stage 342 of performing a modulo P operation by a sequence of subtractions and comparisons that start by subtracting the intermediate result from a variable that equals $Px2^x$; wherein the length of the variable equals a number of bits of the intermediate result.

Multiple repetition of the stages of method 300 can implement multiple row permutation functions of the form $PFr(Y)=$modulo P $(Qr^Y)$, wherein at least two different row permutation functions associated with at least different rows have Qr of different values.

Figure 4:
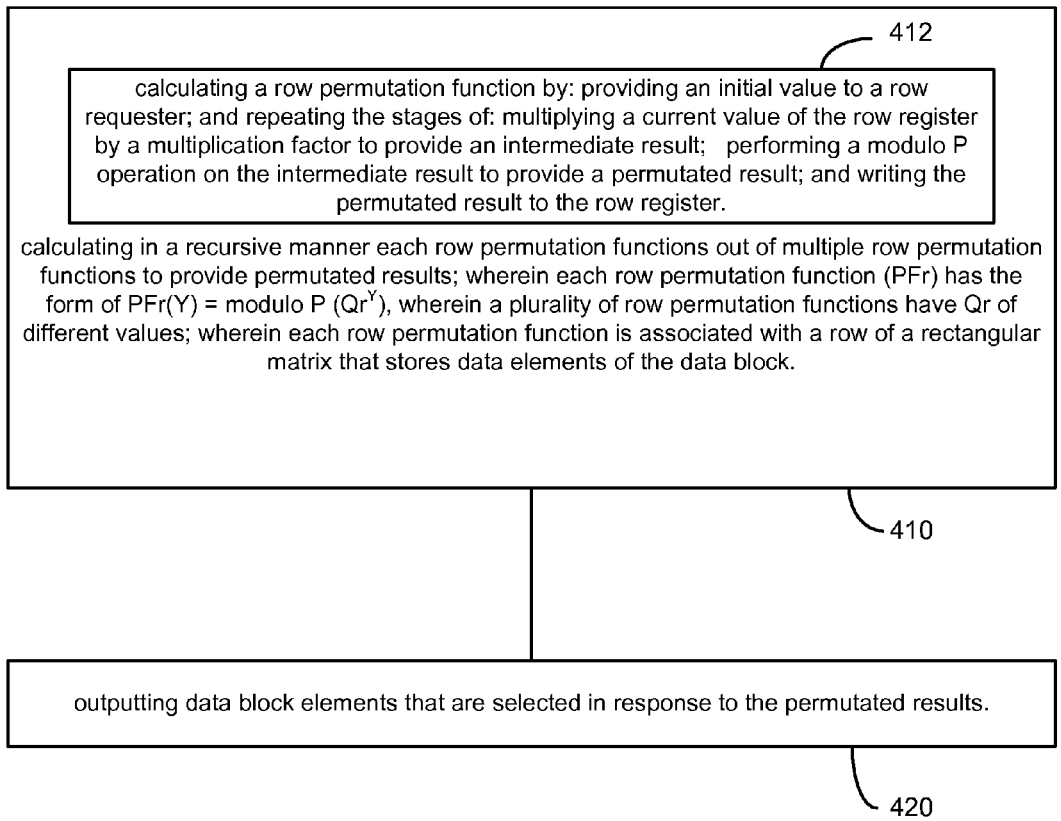
FIG. 4 schematically shows an example of an embodiment of a method.

FIG. 4 schematically shows an example of an embodiment of method 400 for generating an interleaved output during a decoding of a data block.

Method 400 starts by stage 410 of calculating in a recursive manner each row permutation functions out of multiple row permutation functions to provide permutated results; wherein each row permutation function (PFr) has the form of $PFr(Y)=$modulo P $(Qr^Y)$, wherein a plurality of row permutation functions have Qr of different values; wherein each row permutation function is associated with a row of a rectangular matrix that stores data elements of the data block.

Stage 410 is followed by stage 420 of outputting data block elements that are selected in response to the permutated results.

Stage 410 can include multiple repetitions of stages 310, 320, 330, 340 and 350.

Stage 410 can include stage 412 of calculating a row permutation function by: providing an initial value to a row requester; and repeating the stages of: multiplying a current value of the row register by a multiplication factor to provide an intermediate result; performing a modulo P operation on the intermediate result to provide a permutated result; and writing the permutated result to the row register.

The multiplication factor can equal a result of a modulo P operation on $V^I$; wherein V is a primitive root selected in response to the size of the data block and I is indicative of a number of repetitions of the stages of multiplying, performing, and writing.

Stage 410 can also include receiving a direction indication and selecting the multiplication factor in response to the direction indication and to a row indicator.

Accordingly, instead of having primary and secondary permutations such as P1(A), P2(A) and S(A), a pair of permutations S1(A) and S2(A) are defined. They are driven from P(A), S1(A) and S2(A) but can assist in simplifying the interleaving process.

$$S1(A)=S[P1(A)]=(3^{A\%6})\%7=3^A\%7$$

$$S2(A)=S[P1(A)]=(3^{A\%6})\%7=3^{5A}\%7=(3^5\%7)^A\%7=5^A\%7.$$

S1(A) defines a permutation S1 that includes the following elements: 1, 3, 2, 6, 4, 5. In order to progress (forward) from a current element of S1 to the following element of S1 the current element should be multiplied by 3 and the result should be subjected to a modulo 7 operation. Thus, a forward multiplication factor of S1 equals 3. In order to progress (backwards) from a current element of S1 to the preceding element of S1 the current element should be multiplied by 5 and the result should be subjected to a modulo 7 operation. Thus, a backward multiplication factor of S1 equals 5.

S2(A) defines a permutation S2 that includes the following elements: 1, 5, 4, 6, 2, 3. In order to progress (forward) from a current element of S2 to the following element of S2 the current element should be multiplied by 5 and the result should be subjected to a modulo 7 operation. Thus, a forward multiplication factor of S2 equals 5. In order to progress (backwards) from a current element of S2 to the preceding element of S2 the current element can be multiplied by 3 and the result should be subjected to a modulo 7 operation. Thus, a backward multiplication factor of S2 equals 3.

In both cases the initial value of each row register is one—corresponding to the first element in S1 and S2.

S1(A) and S2(A) can be implemented in a recursive manner, by multiplying a current value of a row register by either a forward multiplication factor or by a backward multiplication factor.

In the following specification, the invention has been described with reference to specific examples of embodiments of the invention. It will, however, be evident that various modifications and changes may be made therein without departing from the broader spirit and scope of the invention as set forth in the appended claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A method for generating an interleaved output during a decoding of a data block, the method comprises:

selecting, in response to a row indicator, a row register and a multiplication factor to provide a selected row register and a selected multiplication factor; wherein the selected multiplication factor is responsive to a size of the data block;

multiplying a value stored in the selected row register by the selected multiplication factor to provide an intermediate result;

performing a modulo P operation on the intermediate result to provide a permutated result; wherein the permutated result and the value stored in the selected row register are adjacent elements of the same permutation; wherein P is responsive to a size of the data block;

writing the permutated result to the selected row register; and outputting a data block element that is selected in response to the permutated result.

2. The method according to claim 1 comprising receiving or calculating the multiplication factor by performing a modulo P operation on $V^I$; wherein V is a primitive root selected in response to the size of the data block and I is indicative of a number of repetitions of the stages of selecting, multiplying, performing, writing and outputting are repeated.

3. The method according to claim 1 comprising receiving a direction indication and selecting the multiplication factor in response to the direction indication and the row indicator.

4. The method according to claim 3 wherein each row register is associated with a forward multiplication factor and backward multiplication factor; wherein the backward multiplication factor is an inverted element of the forward multiplication factor.

5. The method according to claim 1 comprising performing a modulo P operation by a sequence of subtractions and comparisons that start by subtracting the intermediate result from a variable that equals $P \times 2^x$; wherein the length of the variable equals a number of bits of the intermediate result.

6. The method according to claim 1 comprising providing initial values to the row registers; wherein a repetition of the stages of selecting, multiplying, performing and writing implements a row permutation function PFr of the form PFr(Y)=modulo P ($Qr^Y$), wherein at least two different row permutation functions associated with at least different rows have Qr of different values.

7. A method for generating an interleaved output during a decoding of a data block, the method comprising:

calculating in a recursive manner each row permutation functions out of multiple row permutation functions to provide permutated results; wherein each row permutation function (PFr) has the form of PFr(Y)=modulo P ($Qr^Y$), wherein a plurality of row permutation functions have Qr of different values; wherein each row permutation function is associated with a row of a rectangular matrix that stores data elements of the data block; and outputting data block elements that are selected in response to the permutated results calculating a row permutation function by: providing an initial value to a row requester; and repeating the stages of: multiplying a current value of the row register by a multiplication factor to provide an intermediate result; performing a modulo P operation on the intermediate result to provide a permutated result; and writing the permutated result to the row register.

8. The method according to claim 7 wherein the multiplication factor equals a result of a modulo P operation on $V^I$; wherein V is a primitive root selected in response to the size of the data block and I is indicative of a number of repetitions of the stages of multiplying, performing, and writing.

9. The method according to claim 7 comprising receiving a direction indication and selecting the multiplication factor in response to the direction indication and to a row indicator.

10. A system for generating an interleaved output during a decoding of a data block, the system comprises:
   multiple row registers, each row register is associated with a row of a rectangular matrix that stores data elements of the data block;
   a selection circuit that is configured to select, in response to a row indicator, a row register and a multiplication factor to provide a selected row register and a selected multiplication factor; wherein the selected multiplication factor is responsive to a size of the data block;
   a multiplier, configured to multiply a value stored in the selected row register by the selected multiplication factor to provide an intermediate result;
   a modulo P circuit, configured to perform a modulo P operation on the intermediate result to provide a permutated result;
   wherein the permutated result and the value stored in the selected row register are adjacent elements of the same permutation;
   wherein P is responsive to a size of the data block;
   wherein the selection circuit if further configured to write the permutated result to the selected row register; and
   an output circuit, configured to output a data block element that is selected in response to the permutated result.

11. The system according to claim 10 wherein the selected multiplication factor equals a result of performing a modulo P operation on $V^I$; wherein V is a primitive root selected in response to the size of the data block and I is indicative of a number of repetitions of the stages of selecting, multiplying, performing, writing and outputting are repeated.

12. The system according to claim 10 wherein the selection circuit is configured to receive a direction indication select the selected multiplication factor in response to the direction indication and the row indicator.

13. The system according to claim 12 wherein each row register is associated with a forward multiplication factor and backward multiplication factor; wherein the backward multiplication factor is an inverted element of the forward multiplication factor.

14. The system according to claim 10 wherein the modulo P circuit is configured to perform a modulo P operation by a sequence of subtractions and comparisons that start by subtracting the intermediate result from a variable that equals $Px2^x$; wherein a length of the variable equals a number of bits of the intermediate result.

15. The system according to claim 10 wherein the row registers are configured to receive initial values; wherein the system is configured to implement multiple row permutation functions, each row permutation function is of the form PFr(Y)=modulo P ($Qr^Y$), wherein at least two different row permutation functions associated with at least different rows have Qr of different values.

16. A system for generating an interleaved output during a decoding of a data block, the system comprises:
   a recursive row permutation functions calculation circuit configured to calculate in a recursive manner each row permutation functions out of multiple row permutation functions to provide permutated results;
   wherein each row permutation function (PFr) has the form of PFr(Y)=modulo P ($Qr^Y$);
   wherein a plurality of row permutation functions have Qr of different values;
   wherein each row permutation function is associated with a row of a rectangular matrix that stores data elements of the data block; and
   an output circuit adapted to output data block elements that are selected in response to the permutated results
   wherein the recursive row permutation functions calculation circuit is initialized by providing initial values to multiple row requesters; and is configured to repetitively multiply a current value of the row register by a multiplication factor to provide an intermediate result; perform a modulo P operation on the intermediate result to provide a permutated result; and write the permutated result to the row register.

17. The system according to claim 16 wherein the multiplication factor equals a result of a modulo P operation on $V^I$; wherein V is a primitive root selected in response to the size of the data block and I is indicative of a number of repetitions of the stages of multiplying, performing, and writing.

18. The system according to claim 17 wherein the recursive row permutation functions calculation circuit is configured to receive a direction indication and select the multiplication factor in response to the direction indication and to a row indicator.

* * * * *